Aug. 1, 1950 — T. V. FETTIG — 2,516,969
CABLE GUIDE AND CLAMP
Filed Dec. 12, 1945 — 2 Sheets-Sheet 1
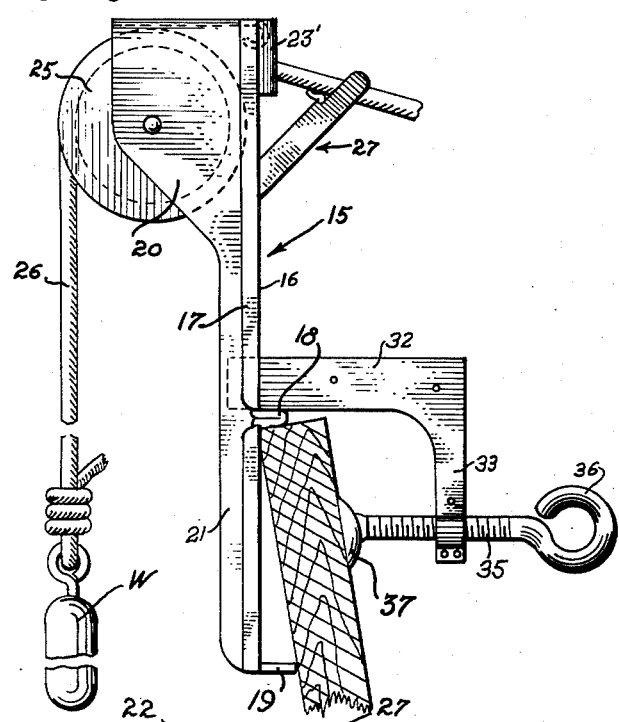
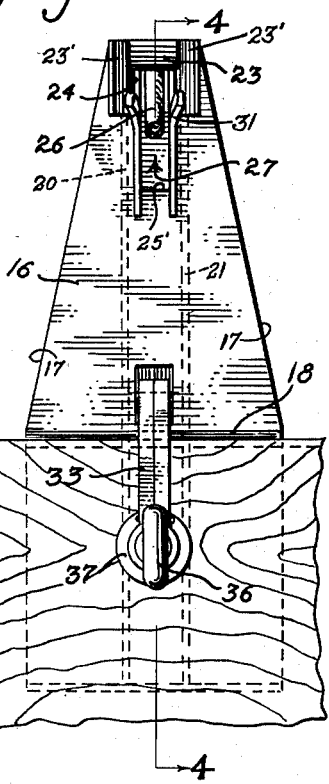
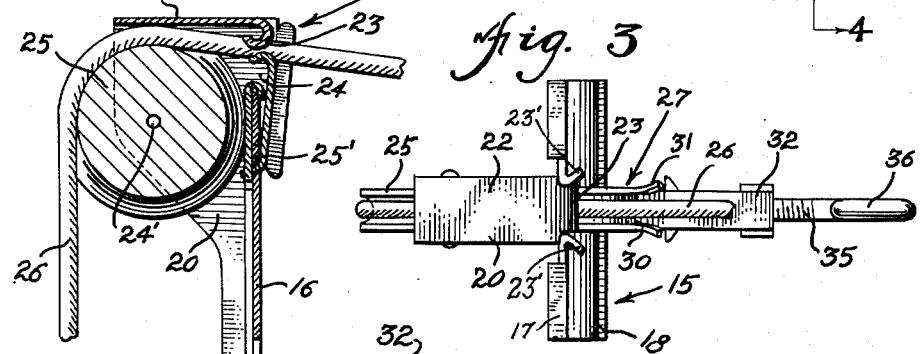
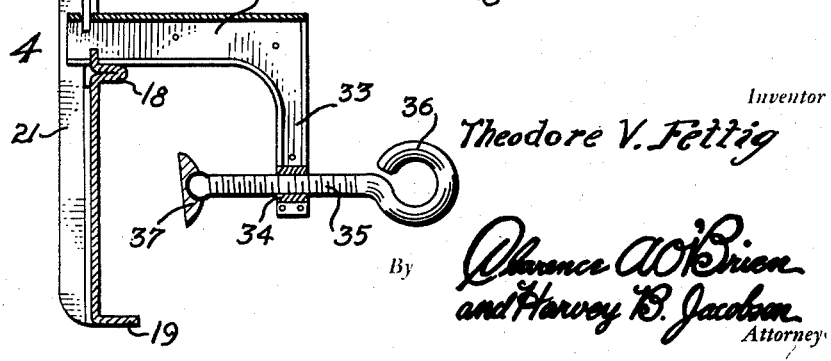
Inventor
Theodore V. Fettig
By Clarence A. O'Brien
and Harvey B. Jacobson
Attorney

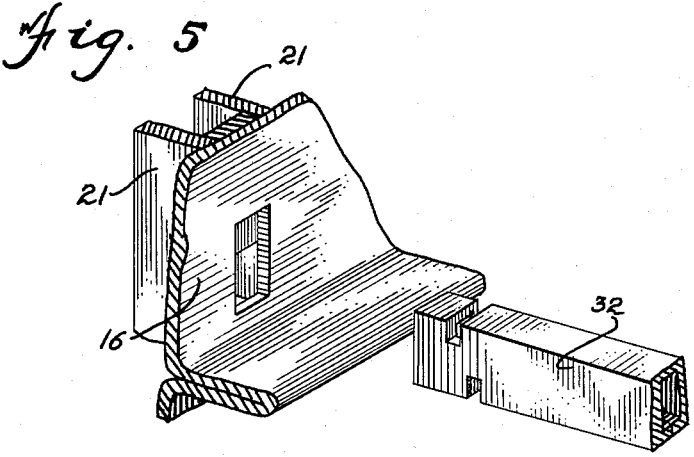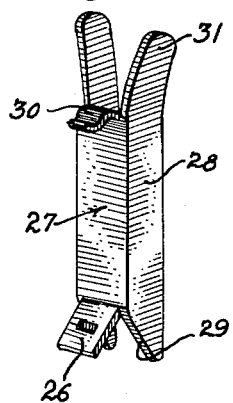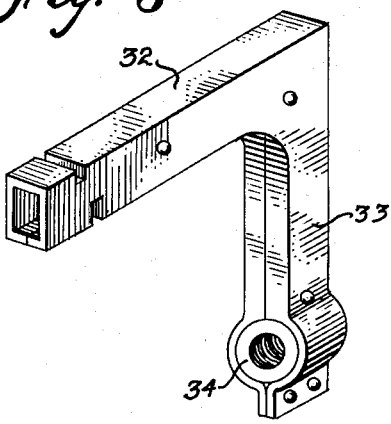

Patented Aug. 1, 1950

2,516,969

UNITED STATES PATENT OFFICE 2,516,969

CABLE GUIDE AND CLAMP

Theodore V. Fettig, La Porte, Ind.

Application December 12, 1945, Serial No. 634,525

2 Claims. (Cl. 254—188)

This invention relates to a cable guide and clamp and more particularly to a device for clamping the anchor cables of small boats.

The primary object of the invention is to secure a boat anchor in suspended position ready for immediate use.

Another object is to render the device portable so that it may be transported from place to place by the user for attachment to boats which may be available at different locations.

The above and other objects may be attained by employing this invention which embodies among its features a pulley over which a cable is adapted to be trained, a cable guard associated with the pulley and a cable clamp so associated with the cable guard and pulley that when the clamp is in one position it will cooperate with the cable guard in clamping the cable and holding it against movement in one direction.

Other features include means for clamping the device to a support in such a manner that it may be readily removed and clamped to another support.

In the drawings:

Figure 1 is a side view of a cable guide and clamp embodying the features of this invention showing the same as it would appear when clamped to the gunwale of a boat, Figure 2 is an end view of Figure 1, Figure 3 is a top plan view of the cable guide and clamp illustrated in Figure 1, Figure 4 is a vertical sectional view taken substantially on the line 4—4 of Figure 2, Figure 5 is a fragmentary enlarged perspective view of portions of the device showing the manner of assembly thereof, Figure 6 is a perspective view of the clamp for attaching the device to a support, and Figure 7 is a perspective view of the cable clamp.

Referring to the drawings in detail a supporting plate designated generally 15 comprises a sheet metal body 16 of substantially triangular configuration as illustrated in Figure 2 and having angularly extending side flanges 17 which serve to reenforce the plate structure. Formed intermediate the ends of the plate 16 is a fold forming a flange 18 which serves as a rest to engage the upper edge of the gunwale of a boat as illustrated in Figure 1. A flange 19 is formed at the lower edge of the body 16 and extends in the same general directions as the flange 18 in spaced parallel relation thereto so that when the device is in position on the gunwale of a boat the plate 16 will stand in substantially vertical position.

Riveted or otherwise permanently fixed to the plate 16 intermediate its side edges is an inverted U-shaped cable guard 20 having depending legs 21 which extend throughout the entire length of the plate 16 and serve to reenforce the same against bending action. The bight or transverse portion 22 of the inverted U-shaped cable guard 20 is arranged in substantial alignment with the upper edge of the plate 16 and is provided with a clamp jaw 23 formed by curling back a portion of the bight portion 22 as illustrated in Figure 4. Formed in the plate 16 adjacent its upper end and in alignment with the space between the legs of the U-shaped cable guard 20 is a slot 24 into which the jaw 23 extends. The slot 24 is formed by the upper end of the plate 16 being centrally and vertically split and the portions of plate 16 adjacent thereto being struck outwardly from the cable guard 20 to form diverging guide flanges 23', as clearly shown in Figure 3. Mounted on a suitable axial shaft 24' between the legs of the U-shaped cable guard 20 is a suitable grooved pulley 25 over which a cable 26 is adapted to be trained. The outer end of this cable is designed to support a suitable boat anchor W though it obviously may be attached to any other object to be moved or lifted by the cable. Formed in spaced relation to the slot 24 in the plate 16 is a transversely extending slot 25' for the reception of a tongue 26 (Fig. 7) formed at the lower end of a cable clamp designated generally 27. This cable clamp comprises a transversely U-shaped body 28 the lower end of the bight portion of which is slit adjacent opposite sides and bent outwardly to form the tongue 26 while the ends of the legs are beveled as at 29 for a purpose to be more fully hereinafter explained. The upper end of the transversely U-shaped body 28, like the lower end is slit along opposite sides to form a tongue which is bent outwardly as shown to provide a clamp jaw 30 and the upper ends of the legs of the U-shaped body are flared as at 31 to form cable guiding ears. The clamp 27 is pivotally mounted on the plate 16 by entering the tongue 26 into the slot 25' as illustrated in Figure 4 and when in such position the clamp jaw 30 may be moved into a position to cooperate with the clamp jaw 23 in clamping the cable 26 against movement about the pulley 25 in one direction.

Extending outwardly from the plate 16 from the side opposite that carrying the cable guard 20 is an arm 32 carrying a depending arm 33 at its outer end. The lower end of the depending arm has secured thereto to an internally screw threaded bushing 34 into which the threaded shank 35 of a clamp screw is received. One end of this clamp screw carries a suitable head 36 by means of which the screw may be turned and swively connected to the opposite end of the clamp screw is a clamping plate 37 which is adapted to cooperate with the flanges 18 and 19 in clamping the device to a support.

In operation the cable guide and clamp may be carried about at the convenience of the user and when it is desired to support as for instance an anchor's cable on the side of a boat the unit is placed in the position illustrated in Figure 1 and the clamp screw turned to move the clamp pad or plate 37 into clamping position. Due to the engagement of the edge of the flange 19 with the side of the boat and the engagement of the under face of the flange 18 with the upper edge of the gunwale of the boat the cable guide and clamp will stand in a substantially vertical position. In order to lower the anchor the clamp 27 is moved into the position shown in Figure 1 so that the cable may run freely beneath the clamp jaw 23. When a sufficient amount of cable has been paid out the clamp 27 is moved into the position illustrated in Figure 4 so as to cause the cable to be clamped between the jaws 23 and 30. It will be thus seen that no further movement of the cable under the influence of the anchor can be had but at the same time the anchor may be lifted at any moment by pull on the cable in the opposite direction which will automatically throw the cable clamp 27 into the position shown in Figure 1 and thus permit its free running over the pulley 25.

While in the foregoing there has been shown and described the preferred embodiment of this invention it is to be understood that minor changes in the details of construction, combination and arrangement of parts may be resorted to without departing from the spirit and scope of the invention as claimed.

I claim:
1. A cable guide and clamp comprising an elongated supporting plate, means carried by the plate to support said plate in an upright position on the gunwale of a boat, an inverted U-shaped cable guard carried by the plate and projecting laterally therefrom adjacent the upper end thereof, a pulley mounted in the cable guard to rotate about an axis which lies in spaced parallel relation to the plate near the upper end thereof, a cable clamp pivotally mounted on the plate to swing in a vertical arc on the side of the plate remote from the cable guard for engaging a cable trained over the pulley and clamping it between the end of the clamp remote from the pivotal mounting thereof and the transverse portion of the cable guard, and spaced parallel reinforcing and stiffening legs extending from the cable guide and connected to the plate on the side thereof remote from the cable clamp.

2. A cable guide and clamp comprising an elongated supporting plate, adapted to be fixed in an upright position to the gunwale of a boat, an inverted U-shaped cable guard carried by the plate and projecting laterally therefrom adjacent the upper end thereof, a pulley mounted in the cable guard to rotate about an axis which lies in spaced parallel relation to the plate near the upper end thereof, an elongated cable clamp pivotally mounted adjacent the upper end of the plate to swing in a vertical arc on the side of the plate remote from the cable guard to cooperate with the cable guard in clamping a cable trained over the pulley, cable guiding ears extending longitudinally from the end of the cable clamp remote from the pivotal mounting thereof for cooperation with the transverse portion of the cable guard in clamping a cable trained over the pulley, an L-shaped bracket carried by the side of the plate remote from that carrying the cable guard, said bracket projecting outwardly from the plate intermediate the ends thereof, a clamp screw carried by the arm of the bracket remote from the plate and spaced parallel reinforcing and stiffening legs extending from the cable guard on the side of the plate remote from the cable clamp, said legs contacting the plate throughout the entire length thereof and being fixed to said plate.

THEODORE V. FETTIG.

REFERENCES CITED

The following references are of record in the file of this patent:

UNITED STATES PATENTS

| Number | Name | Date |
|--------|------|------|
| 723,231 | Benedict | Mar. 24, 1903 |
| 771,470 | Fulton | Oct. 4, 1904 |
| 1,109,052 | Edman et al. | Sept. 1, 1914 |
| 1,327,059 | Ortman | Jan. 6, 1920 |
| 1,482,268 | Schopper | Jan. 29, 1924 |
| 1,710,697 | Gilbert | Apr. 30, 1929 |
| 2,075,214 | Lorentzen | Mar. 30, 1937 |